US009569464B1

(12) United States Patent  
Crow et al.

(10) Patent No.: US 9,569,464 B1  
(45) Date of Patent: Feb. 14, 2017

(54) ELEMENT IDENTIFICATION IN DATABASE

(71) Applicant: Pivotal Software, Inc., Palo Alto, CA (US)

(72) Inventors: Alexis Kohnstamm Crow, Redwood City, CA (US); Sarah Joann Aerni, San Francisco, CA (US); Hulya Emir-Farinas, San Francisco, CA (US); Gautam Sakleshpur Muralidhar, Frisco, TX (US); Regunathan Radhakrishnan, Foster City, CA (US)

(73) Assignee: Pivotal Software, Inc., San Francisco, CA (US)

( * ) Notice: Subject to any disclaimer, the term of this patent is extended or adjusted under 35 U.S.C. 154(b) by 254 days.

(21) Appl. No.: 14/307,142

(22) Filed: Jun. 17, 2014

Related U.S. Application Data

(60) Provisional application No. 62/004,075, filed on May 28, 2014.

(51) Int. Cl.  
*G06F 17/30* (2006.01)

(52) U.S. Cl.  
CPC ... *G06F 17/30259* (2013.01); *G06F 17/30442* (2013.01); *G06F 17/30253* (2013.01);  
(Continued)

(58) Field of Classification Search  
CPC .............. G06F 17/30442; G06F 17/30471; G06F 12/0802; G06F 17/30498; G06F 17/30867; G06T 11/005; G06T 15/205; G06T 15/506; G06T 1/0007  
(Continued)

(56) References Cited

U.S. PATENT DOCUMENTS 7,224,360 B2 * 5/2007 Tatsumi ................ G06T 15/506  
                                                      345/420  
8,150,151 B2 * 4/2012 Gori ..................... G06K 9/4619  
                                                      382/156

(Continued)

FOREIGN PATENT DOCUMENTS

WO    WO 2014/049596     4/2014

OTHER PUBLICATIONS

Collins, "Lecture 4: Smoothing," Powerpoint Presentation, retrieved Jun. 17, 2014, http://www.cse.psu.edu/~rcollins/CSE486/lecture04.pdf, 45 pages.

(Continued)

*Primary Examiner* — Dangelino Gortayo  
(74) *Attorney, Agent, or Firm* — Fish & Richardson P.C.

(57) ABSTRACT

This document describes, among other things, a computer-implemented method. The method includes obtaining a structured data object that having a plurality of nodes that represent elements in the data object. One or more tables that define a table representation of the data object can be generated. The one or more tables can include a plurality of table entries that correspond to the plurality of nodes, respectively. For each of one or more first nodes from among the plurality of nodes, the method can include identifying information about one or more second nodes that are determined to be adjacent or otherwise related to the first node by performing window functions along two or more coordinate systems in the one or more tables. The window function can be centered on a particular table entry that corresponds to the first node of the data object.

20 Claims, 7 Drawing Sheets

(52) U.S. Cl.
CPC .. *G06F 17/30312* (2013.01); *G06F 17/30471* (2013.01); *G06F 17/30477* (2013.01); *G06F 17/30607* (2013.01)

(58) Field of Classification Search
USPC ........ 707/713, 718, 756, 769, 741; 382/154, 382/128, 131; 345/419, 427, 426, 581, 629
See application file for complete search history.

(56) References Cited

U.S. PATENT DOCUMENTS

| | | | |
|---|---|---|---|
| 8,421,906 B2* | 4/2013 | Pollard | G02B 7/36 348/349 |
| 8,543,558 B2* | 9/2013 | Srinivasan | G06F 8/20 707/702 |
| 2003/0165263 A1* | 9/2003 | Hamer | G06K 9/00127 382/133 |
| 2010/0135544 A1* | 6/2010 | Mattiuzzi | G06T 7/0028 382/128 |
| 2012/0191642 A1 | 7/2012 | George | |
| 2014/0214754 A1* | 7/2014 | Li | G06F 17/30433 707/603 |
| 2016/0004928 A1* | 1/2016 | Blanchflower | G06K 9/4685 707/741 |

OTHER PUBLICATIONS

"Image Processing Toolbox," Mathworks.com, retrieved Jun. 17, 2014, http://www.mathworks.com/products/datasheets/pdf/image-processing-toolbox.pdf, 6 pages.

Davey, "SQL Window Functions and You," May 22, 2012, http://hashrocket.com/blog/posts/sql-window-functions, 6 pages.

"Probably the Coolest SQL Feature: Window Functions," Java, SQL and jOOQ, retrieved Jun. 17, 2014, http://blog.jooq.org/2013/11/03/probably-the-coolest-sql-feature-window-functions/, 7 pages.

Xie et al., "In-Database Raster Analytics: Map Algebra and Parallel Processing in Oracle Spatial Georaster," *International Archivers of the Photogrammetry, Remote Sensing and Spatial Information Sciences*, Aug./Sep. 2012, vol. XXXIX-B4, 91-96.

Xie et al., "In-Database Image Processing in Oracle Spatial Georaster," *ASPRS Annual Conference*, Mar. 24-28, 2013, 10 pages.

* cited by examiner

- 102a Obtain Structured Data Object
- 104a Generate Table Representation of Data Object
- 106a Apply Window Function(s) to Table Representation of Data Object
- 108a Determine Adjacencies Using Result of Window Function(s)

104b

| ID | Row | Col. | Intensity |
|----|-----|------|-----------|
| 1  | 0   | 0    | Dark      |
| 2  | 0   | 1    | Light     |
| 3  | 0   | 2    | Light     |
| 4  | 0   | 3    | Dark      |
| 5  | 0   | 4    | Light     |
| 6  | 1   | 0    | Light     |
| 7  | 1   | 1    | Light     |
| 8  | 1   | 2    | Light     |
| 9  | 1   | 3    | Dark      |
| 10 | 1   | 4    | Dark      |
| 11 | 2   | 0    | Dark      |
| 12 | 2   | 1    | Light     |
| 13 | 2   | 2    | Light     |
| 14 | 2   | 3    | Light     |
| 15 | 2   | 4    | Light     |

106b

| ID | Row | Col. | Intensity |
|----|-----|------|-----------|
| 2  | 0   | 1    | Light     |
| 3  | 0   | 2    | Light     |
| 4  | 0   | 3    | Dark      |
| 7  | 1   | 1    | Light     |
| 8  | 1   | 2    | Light     |
| 9  | 1   | 3    | Dark      |
| 12 | 2   | 1    | Light     |
| 13 | 2   | 2    | Light     |
| 14 | 2   | 3    | Light     |

```
0   Create temp table testim_smooth as
1   select img_name, row, col, madlib.array_mean(B_intensity) B_intensity
2   from (
3     select img_name, row, col, array[B_intensity::float8
4     ,(lag(B_intensity) over(partition by col order by row ))::float8
5     ,(lead(B_intensity) over(partition by col order by row ))::float8
6     ,(lag(B_intensity) over(partition by row order by col ))::float8
7     ,(lead(B_intensity) over(partition by row order by col ))::float8
8     ,(lag(B_intensity) over(partition by (row-col)
9         order by col ))::float8
10    ,(lead(B_intensity) over(partition by (row-col)
11        order by col ))::float8
12    ,(lag(B_intensity) over(partition by (row+col)
13        order by col ))::float8
14    ,(lead(B_intensity) over(partition by (row+col)
15        order by col ))::float8
16    ] B_intensity
17  from testim;
```

FIG. 5

ELEMENT IDENTIFICATION IN DATABASE

CROSS-REFERENCE TO RELATED APPLICATIONS

This application claims priority under 35 U.S.C. §119(e)(1) to U.S. Provisional Application Ser. No. 62/004,075, filed on May 28, 2014, the entire contents of which are incorporated herein by reference.

TECHNICAL FIELD

This document generally relates to databases.

BACKGROUND

Computer programs have been developed to perform various operations on structured data objects. Structured data objects include a collection of elements that are arranged with respect to each other in a defined manner. Some examples of structured data objects include images, videos, dense graphs, and crystal lattices. For example, a two-dimensional grayscale image may have many pixels that are arranged into a grid of rows and columns, which may be stored as a two-dimensional array of pixels in computer memory. Image processing techniques have been developed that operate on such a two-dimensional array of pixels when the image is loaded into memory. For example, color filters, smoothing, blurring, and sharpening filters have been developed to operate on an array of pixels in an image. With advances in the capabilities of cameras and other technological systems, the resolution of digital images and, more generally, the size (e.g., element count) of other data objects has continued to increase.

SUMMARY

In light of the larger sizes of data objects and increased computational expense associated with processing such data objects, it is desired to identify an approach that can efficiently perform particular operations on larger data objects. This document generally describes techniques for representing structured data objects in database tables and using database queries to perform one or more operations on the data objects in database. Some operations include determining particular sets of elements in the data object that are related to other elements. For example, techniques are described that permit sets of elements to be identified that are adjacent to one or more elements, respectively, within the structure of a data object. A database query (e.g., SQL query) can be obtained that is configured to efficiently identify, for each of a plurality of center elements in a data object, a set of elements that are adjacent to the center element. The query can use window functions in some implementations to identify adjacent elements. Generally, window functions may use one or more different coordinate systems to efficiently identify different sets of adjacent elements. The coordinate systems can be defined in terms of the particular structure of a data object.

In some implementations, a computer-implemented method includes obtaining a structured data object. The structured data object can include a plurality of nodes that represent elements in the structured data object. One or more tables that define a table representation of the structured data object can be generated. The one or more tables can include a plurality of table entries that correspond to the plurality of nodes, respectively. For each of one or more first nodes from among the plurality of nodes, the method may include identifying information about one or more second nodes that are determined to be adjacent or otherwise related to the first node by performing one or more window functions along two or more coordinate systems in the one or more tables. The window functions can be centered on a particular table entry that corresponds to the first node of the data object. The information about the one or more second nodes that are determined to be adjacent or otherwise related to the first node can be output as a result.

These and other implementations can include one or more of the following features. The structured data object can be an image, and the plurality of nodes can include a plurality of pixels in the image.

The structured data object can be a dense graph.

The structured data object can be an n-dimensional array of nodes, each node in the n-dimensional array being assigned one or more location values that indicate the location of the node in the array. Particular table entries from among the plurality of table entries can be generated so as to include the one or more location values for the nodes that respectively correspond to the particular table entries.

Generating the one or more tables that define the table representation of the structured data object can include converting the n-dimensional array into one or more database tables. Each of one or more rows in the database tables can store data for a respective node from among the plurality of nodes.

The one or more database tables can include (i) one or more first columns for storing the one or more location values of the nodes in the n-dimensional array, and (ii) one or more second columns for storing data values of the nodes in the n-dimensional array.

The one or more tables that define the table representation of the structured data object can include a plurality of rows, each row corresponding to a particular pixel in the image and including one or more table elements that identify a position of the particular pixel in the image and one or more color intensity values for the particular pixel.

The method can further include executing a single database query that identifies the information about the one or more second nodes for all of the one or more first nodes.

The single database query can include a structured query language (SQL) query.

The database query can be configured to cause a computing system to identify, for each of the one or more first nodes, at least one of the one or more second nodes by performing a first set of window functions that identify table entries corresponding to nodes that are adjacent to the first node along a first coordinate system.

The database query can be further configured to cause the computing system to identify, for each of the one or more first nodes, at least one of the one or more second nodes by performing a second set of window functions that identify table entries corresponding to nodes that are adjacent to the first node along a second coordinate system that is different than the first coordinate system.

The first set of window functions can identify table entries corresponding to nodes that are at least one of above, below, and to the side of the first node and that are each offset from the first node in only one dimension in the first coordinate system. The second set of window functions can identify table entries corresponding to nodes that are diagonally adjacent to the first node and that are each offset from the first node in only one dimension in the second coordinate system.

For each of the one or more first nodes, identifying the information about the one or more second nodes can include performing one or more self-joins on the one or more tables that define the table representation of the structured data object.

For each of the one or more first nodes, the information about the one or more second nodes that are determined to be adjacent or otherwise related to the first node can include respective node values. The method can further include, for at least one of the one or more first nodes, determining a composite node value for the first node based at least on some or all of the respective node values for the one or more second nodes. The composite node value can be an average of one or more node values (e.g., a local mean node value), or may be determined using other statistical measures such as the variance or kurtosis of the respective node values for the one or more second nodes and the first node.

The structured data object can be an image, and the method can further include performing a filter on the image by generating, for the at least one of the one or more first nodes, a filtered node value corresponding to the first node based on the composite node value for the first node.

In some implementations, one or more computer-readable devices can include instructions stored thereon that, when executed by one or more processors, cause performance of operations. The operations can include: obtaining a structured data object that includes a plurality of nodes representing elements in the structured data object; generating one or more tables that define a table representation of the structured data object, the one or more tables including a plurality of table entries that correspond to the plurality of nodes, respectively; and for each of one or more first nodes from among the plurality of nodes: identifying information about one or more second nodes that are determined to be adjacent or otherwise related to the first node by performing one or more window functions along two or more coordinate systems in the one or more tables, the one or more window functions being centered on a particular table entry that corresponds to the first node of the data object, and outputting the information about the one or more second nodes that are determined to be adjacent or otherwise related to the first node.

These and other implementations can include one or more of the following features. The operations can further include executing a single database query that identifies the information about the one or more second nodes for all of the one or more first nodes in a single pass through the table representation of the structured data object.

The database query can be configured to cause a computing system to identify, for each of the one or more first nodes, at least one of the one or more second nodes by performing a first set of window functions that identify table entries corresponding to nodes that are adjacent to the first node along a first coordinate system.

The database query can be further configured to cause the computing system to identify, for each of the one or more first nodes, at least one of the one or more second nodes by performing a second set of window functions that identify table entries corresponding to nodes that are adjacent to the first node along a second coordinate system that is different than the first coordinate system.

In some implementations, a system can include one or more processors and one or more computer-readable devices. The one or more computer-readable devices can have instructions stored thereon that, when executed by the one or more processors, cause the one or more processors to perform operations that include: obtaining a structured data object that includes a plurality of nodes representing elements in the structured data object; generating one or more tables that define a table representation of the structured data object, the one or more tables including a plurality of table entries that correspond to the plurality of nodes, respectively; and for each of one or more first nodes from among the plurality of nodes: identifying information about one or more second nodes that are determined to be adjacent or otherwise related to the first node by performing one or more window functions along two or more coordinate systems in the one or more tables, the one or more window functions being centered on a particular table entry that corresponds to the first node of the data object, and outputting the information about the one or more second nodes that are determined to be adjacent or otherwise related to the first node.

BRIEF DESCRIPTION OF THE DRAWINGS

FIG. 1 depicts a flowchart and conceptual flow diagram of an example process for loading a structured data object into a database and performing window functions to identify adjacent elements in the data object.

FIG. 5 depicts an example of a single SQL query that is configured to instruct a database system to perform a smoothing filter on a table representation of an image.

Like reference numbers and designations in the various drawings indicate like elements.

DETAILED DESCRIPTION

Figures 2A, 2B, 2C:
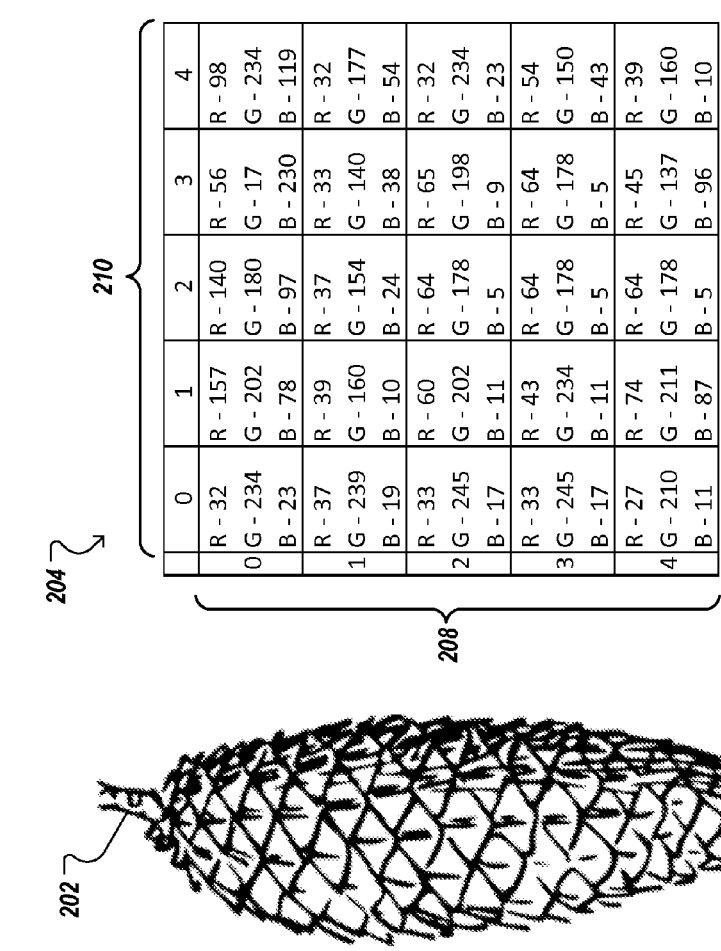
FIG. 2A is an example two-dimensional image having RGB-colored pixels.
FIG. 2B depicts a 2-dimensional array for a grid representation of a portion of the image depicted in FIG. 2A.
FIG. 2C depicts an example table representation of a portion of the image depicted in FIG. 2A.

This document generally describes methods, systems, and other techniques for processing structured data objects in database. In some implementations, window functions are performed in database on representations of structured data objects that have been adapted to a database table format from an original file format. By performing window functions in database, various advantages of database processing may be achieved over other approaches in which the originally formatted data object is loaded and processed in the memory of a computing system. For example, very high resolution images or other large data objects can be more efficiently processed when converted in database than when the original image is loaded for processing in memory, particularly when the image or object size exceeds the memory constraints of a computing system. For instance, a 100 GB high resolution image may not be amenable for efficient processing in a computer that has only 8 GB of RAM. Moreover, by using in database processing for structured data objects, certain techniques, such as massively parallel shared nothing database techniques, can be employed that can significantly reduce processing times over other approaches.

With reference to FIG. 1, a flowchart 101a and a corresponding conceptual flow diagram 101b are shown of an example process 100 for loading a structured data object into a database and performing window functions to identify adjacencies in the data object. In the example flow diagram 101b depicted in FIG. 1, the structured data object is a simple binary image 102b, although the process may also apply to other larger, more complex structured data objects as well.

The process 100 begins at stage 102a, in which a structured data object is obtained. A structured data object 102a can be any ordered collection of data elements, such as an image, a video, a dense graph, or a model of a crystal lattice. The data object 102a may be represented in one or more dimensions and include nodes that represent elements in the data object. For example, an image may be represented as a 2-dimensional collection of pixels that are arranged in a grid made up of rows and columns of pixels (nodes), each pixel defined by one or more values that indicate the color and/or intensity of the pixel in a particular location in the image (e.g., RGB colors, grayscale values, HSV colors, HSL colors). In another example, a video data object may be digitally represented in a raw, uncompressed format comprising a sequence of 2-dimensional or 3-dimensional images, each image in the sequence corresponding to a particular time in the video. In some implementations, the individual elements in a video data object can be pixels that are identified both by their pixel coordinates in a frame of the video (as with a pixel in a still image), and also by a time or frame identifier that indicates which image in the sequence of images in the video the pixel is located in. Depending on the nature of the structured data object in any particular implementation, different objects may be comprised of different types of elements and the elements may be arranged in various different ways. For example, the elements in a data object for a crystal lattice may be representations of atoms in the lattice, and their locations in the lattice may be specified with coordinates that correspond to the particular structure of the lattice (e.g., simple cubic, body-centered cubic, face-centered cubic, etc.).

An example of a structured data object that may be obtained in stage 102a of the process 100 is shown in FIG. 1 as binary image 102b. The binary image 102b comprises a 2-dimensional grid of pixels having five rows and five columns. Each pixel in the image 102b is located at a respective location that may be referenced by coordinates in terms of its row and column. The rows and columns of binary image 102b are numerically designated in the range 0-4, such that the top left pixel has (row, column) coordinates (0,0), and the bottom right pixel has (row, column) coordinates (4,4). In some implementations, other conventions may also be used to assign a unique location value to each of the pixels in the image 102b. Each pixel has a binary intensity value that indicates whether the pixel is dark or light. Thus, the pixels at (0,0), (2,0), and (3,2) have dark intensities, whereas the pixels at (0,4), (1,1), and (2,3) have light intensities in the example. Although in this example the image 102b is binary and the pixels hold just a single binary intensity value, other data objects may hold multiple different values. For example, the pixels in a color image may hold respective red, green, and blue intensity values, while a data object representing interconnected accounts in a social network may have data elements with various pieces of user profile information.

At stage 104a, the structured data object is converted into a table representation of the object. In some implementations, the conversion involves porting the data object to one or more tables in a database (or in multiple databases). The table representation of the data object may be arranged in a different manner than the original data object so as to optimize the ability to perform window functions on the object using database queries. For example, the process 100 may generate a table in which each row corresponds to a particular element in the data object such that all of the elements are distributed among individual rows in the table. This is the manner in which table 104b stores information about each of the pixels from binary image 102b. Each pixel in the binary image 102b is represented in a different row in the table 104b (due to space constraints, FIG. 1 only shows a partial view of table 104b without every row explicitly shown). The columns in the table correspond to different attributes or other information associated with elements in the data object. Thus, table 104b includes an 'ID' column that assigns a unique identifier to each pixel in binary image 102b, 'row' and 'column' attributes in two additional columns that together specify distinct coordinates of the pixels in the binary image 102b, and an 'intensity' column that indicates the intensity values of the pixels. In this example, the original binary image 102b was arranged in a grid of rows and columns of pixels, such as a two-dimensional array. The table representation 104b, on the other hand, represents the image 102b as a long table in which pixel information is stored in rows rather than a grid.

In some implementations, tables may be structured in different ways based on the information contained in the original data objects. For example, additional columns may be provided to accommodate more than one value associated with each data element (e.g., red, green, and blue pixel intensities in an image). As another example, the table may be transposed such that entries for each element in the structured data object are provided in respective table columns, and the rows indicate attributes for each entry. Regardless of the particular manner in which data is organized in the table representations 104 of the data object, the data may be stored in a lossless fashion. For example, the original data object may be reversibly reconstructed from the table representation of the data object because no data is lost (e.g., through compression) when converting the original data object to the table representation of the data object.

At stage 106a, the process 100 applies one or more window functions to the table representation of the structured data object. Particular techniques related to performing window functions in database are described in greater detail below with respect to FIGS. 4 and 5. Window functions generally identify elements that are located relative to other elements according to one or more pre-defined relationships among the elements. In some implementations, window functions are programmed to identify elements that are adjacent to a particular (center) element in a data object. For example, all of the inner pixels in a 2-dimensional grid of pixels in an image have eight immediately adjacent pixels. The eight adjacent pixels include the pixels above and below, to each side, and at the four corners of the respective inner pixel. Other data objects may have more or fewer immediately adjacent data elements. For example, a center pixel, which is the particular pixel element about which a window function operates to identify adjacent elements, in a 3-dimensional object may have 26 immediately adjacent pixels. A data element in a time-variant data object, such as video, may have both spatial and temporally adjacent elements. For example, to perform motion blurring among a sequence of frames in a video, the window functions can identify pixels that are adjacent to a common pixel location in multiple frames of the video.

In some implementations, the window functions applied in stage 106a may be configured to select an element that is immediately adjacent to a particular center element. For example, pixels that are offset from a particular pixel in just one dimension of an image may be selected. Multiple different coordinate systems may be used by multiple different window functions to identify different adjacent elements. For example, one or more window functions that use a first coordinate system may identify pixels above and below a center pixel, and one or more window functions that use a second coordinate system may identify pixels at particular corners of a center pixel.

In some implementations, window functions may be configured to identify, for a particular center element, other elements than those that are immediately adjacent to the center element. These other elements may be identified in addition to immediately adjacent elements or alternatively to immediately adjacent elements. For example, elements within a pre-determined or user-defined degree of separation from a center element may be identified by enlarging a neighborhood of interest around a center element. In some implementations, multiple window functions can be performed that each identify a particular element in the neighborhood of the center element so that, together, the multiple window functions identify all of the elements in the neighborhood. Elements that are immediately adjacent to a center element may be identified within a first degree of separation, and additional elements that are immediately adjacent to any of the immediately adjacent elements may be identified within a second degree of separation. Elements encompassed by window functions of higher orders may be determined similarly.

Window functions can be performed in database for each of all or some of the elements in the table representation of a structured data object. In some implementations, the window functions can be efficiently performed on very large data objects by leveraging massively parallel processing techniques for databases that may not be as readily available outside of the database context. For example, one application of these techniques is to perform a smoothing filter on an image by generating smoothed values of each pixel in the image that are average (e.g., mean) pixel values calculated from one or more of the adjacent pixel values for each pixel. In a 2-dimensional image, including corner adjacencies, for example, an original intensity value of a particular pixel may be averaged with the respective intensity values of its eight adjacent pixels to generate an intensity level for a corresponding pixel in the smoothed image. The process of generating an entire smoothed image can involve many operations to identify the adjacent pixels for all of the pixels in an image and to perform a pre-defined averaging operation for each of the pixels. By using parallel processing techniques and performing window functions in database, the process can be performed efficiently and quickly, even for large images or other large, structured data objects.

Table 106b is a filtered version of table 104b that shows only elements that are adjacent to center pixel (1,2) of binary image 102b. The adjacent elements in table 106b may each be identified using respective window functions. Therefore, table entries for pixels (0,1) through (2,3) are shown in the filtered table 106b as being within the defined window of center pixel (1,2). In some implementations, window functions can be defined by a structured query language (SQL) query or other database query. One or more queries may be formulated to apply one or more window functions to one or more elements in a structured data object. For example, FIG. 5 shows an example of a single SQL query 500 that is configured to cause a database system to execute a smoothing filter on a table representation of an image. When executed, the single database query 500 causes the database system to perform window functions on each pixel element of a particular image and to determine a local mean pixel intensity for each pixel for use in a smoothed image. In some implementations, the database query 500 can perform window functions and determine mean pixel intensities for each pixel in an image in just one pass through data in a database table.

With reference again to FIG. 1, stage 108a of the process 100 includes determining adjacencies using the result of one or more window functions. For example, the one or more window functions applied in stage 106a identified pixels that are represented in filtered table 106b. The rows in the filtered table 106b correspond to pixels that are adjacent to the particular center pixel (1,2). A broken-out representation of binary image 102b is shown in image 108b. Image 108b is broken out to visually show the elements that fall within the 3×3 neighborhood 110 of center pixel (1,2) (neighborhood 110 is demarcated by dashed lines around its perimeter). Neighborhood 110 consists of a section of binary image 102b that includes the 9 pixels represented by the selected rows in filtered table 106b and that are within the bounds of one or more window functions that identify adjacent pixels.

Figure 3B:
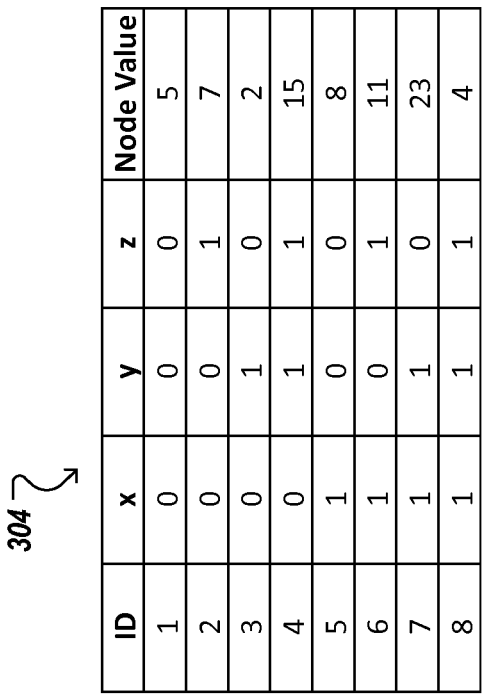
FIG. 3B depicts an example table representation of the unit portion of the three-dimensional cubic data object of FIG. 3A.
Figure 3A:
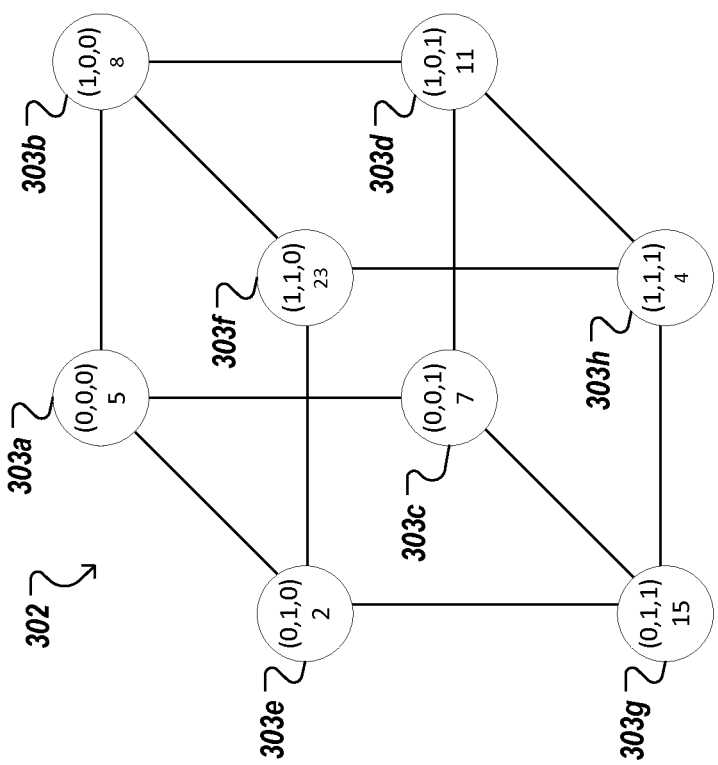
FIG. 3A depicts an example representation of a unit portion of a three-dimensional cubic data object.

FIGS. 2A-2C and 3A-3B depict two examples of structured data objects that are converted to table representations for storage in a database. The resulting database tables are configured in a manner that facilitates the use of database queries to perform window functions centered on one or more elements of the data objects. FIGS. 2A-2C show an example of a two-dimensional image and corresponding grid (e.g., array) and table representations of the image. FIGS. 3A-3B show an example of a three-dimensional data object and a corresponding table representation of the object.

FIG. 2A is a two-dimensional image 202 of a pinecone. The image 202 includes a plurality of pixels that s a color of the image 202 at each point in the image 202. The pixels may be arranged according to a defined structure. In some implementations, the pixels may be ordered in a grid comprised of rows and columns so that each pixel, except at the outer edges of the image 202, has neighboring pixels directly above and below and to the left and right. A grid representation 204 of a portion of the image 202 is shown in FIG. 2B. The grid representation 204 depicts the spatial arrangement of pixels in image 202, and shows the 8-bit RGB color intensity levels for each pixel in the image 202. Pixels in the image 202 have a location that can be defined in one coordinate system in terms of the respective rows and columns to which they belong. For example, the grid representation 204 shows five columns 210 of pixels and five rows 208 of pixels. The pixel located at the (row, column) coordinate (0,0) may be toward the top left of the image 202, whereas the pixel located at (4,4) may be located further toward the bottom right of the image 202. The grid representation 204 shows, for example, that the pixel located at (0,0) has RGB intensity values 32, 234, and 23, respectively. The grid representation 204 may be stored as a multi-dimensional array as a file outside of a database in some implementations.

FIG. 2C shows one example of a table representation 206 of the portion of the image 202 depicted in the grid representation 204. Here, the table representation 206 includes a distinct row for each of the pixels in the image 202. Each row includes the coordinates of the pixel and the RGB intensity levels of the pixel in respective columns. As described herein, the table representation 206 may be configured to facilitate database querying on the table to perform operations such as window functions that permit determination of adjacent pixels in the image 202.

Other types of structured data objects in addition to images may also be modeled and represented in database tables as well. FIG. 3A depicts one example of such an object. In particular, a unit portion of a three-dimensional cubic object 302 is depicted in FIG. 3A. The cubic object 302 may extend further in one or more directions according to the same grid pattern depicted in the unit portion. The cubic object 302 includes a plurality of elements 303 located at discrete locations in three-dimensional space. For example, the element 303a with value 5 is located at (0,0,0), and the element 303g with value 15 is located at (0,1,1). A table representation 304 of the cubic object 302 can be generated to represent the object 302 in a database in some implementations. Like the table representation 206 of the image 202 shown in FIG. 2C, the table representation 304 of the cubic object 302 can include a plurality of rows that correspond to respective elements of the represented data object (here, the cubic object 302). The table representation 304 includes three columns for the x, y, and z coordinates, respectively, of each element, and a value column for holding the respective values of the elements.

Figure 4:
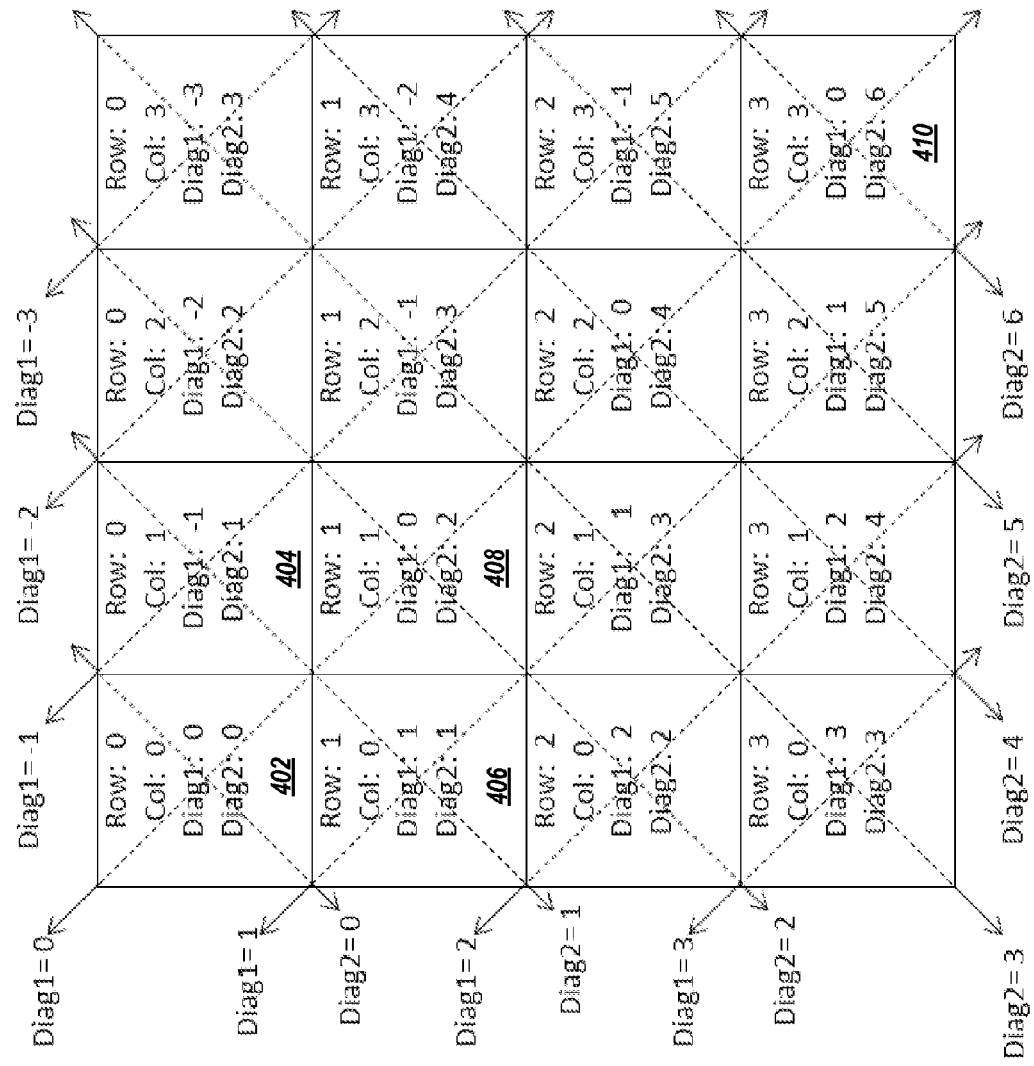
FIG. 4 depicts an example of a structured data object in which the location of elements is specified using multiple different coordinate systems.

FIG. 4 depicts an example of a structured data object 400 in which the location of elements in the data object can be specified using multiple different coordinate systems. For example, elements in the structured data object 400 can be identified using at least 6 different coordinate systems. In a first coordinate system, elements are identified by (row, column) value pairs. In a second coordinate system, elements are identified by (diagonal-1, column) value pairs. In a third coordinate system, elements are identified by (diagonal-2, column) value pairs. In a fourth coordinate system, elements are identified by (diagonal-1, row) value pairs. In a fifth coordinate system, elements are identified by (diagonal-2, row) value pairs. In a sixth coordinate system, elements are identified by (diagonal-1, diagonal-2) value pairs. Thus, for example, whereas coordinates in the first coordinate system may run along horizontal rows and vertical columns, coordinates in the second coordinate system run along pairs of diagonals. Additional coordinate systems may define additional directions for identifying additional neighboring elements.

Examples of dimensions that can be used in various combinations to form any of the six aforementioned coordinate systems are depicted in FIG. 4, which are shown overlaid on the structured data object 400. The particular data object 400 that is shown may be any data object with certain structure such as a two-dimensional still image, a particular frame in a video, or a particular plane of a three-dimensional object. Each element in the data object 400 has a unique location that can be specified in any of the six coordinate systems. For example, element 402 at the most top left position of data object 400 can be identified by the coordinate values (0,0) in all of the coordinate systems because it is located in row 0, column 0, diagonal-1 0, and diagonal-2 0. Other elements can be identified similarly. Thus, the most bottom right element 410, for example, can be identified in the first coordinate system with (row, column) values (3,3), in the second coordinate system with (diagonal-1, column) values (0,3), and in the sixth coordinate system with (diagonal-1, diagonal-2) values (0,6). Thus, both element 402 and element 410 lie on the same first diagonal, but are in neither the same row nor column.

In some implementations, the coordinates for elements in one coordinate system can be determined from the coordinates for the same elements in another coordinate system according to a defined mathematical relationship. For example, as shown in FIG. 4, the first set of diagonals (diagonal-1 values) are numbered such that the first diagonal coordinate for an element is equal to the row coordinate minus the column coordinate for the element (i.e., diagonal-1=row−column). The second set of diagonals (diagonal-2 values) are numbered such that the second diagonal coordinate for an element is equal to the row coordinate plus the column coordinate for the element (i.e., diagonal-2=row+column). Using these relationships, for example, given the (row, column) coordinates of an element in the first coordinate system, the coordinates for that element in any of the other five coordinate systems can be determined. Thus, element 406 is uniquely identified in the data object 400 in the first coordinate system by (row, column) coordinates (1,0). The coordinates of element 406 in the second coordinate system are therefore (diagonal-1, column)=(row−column, column)=(1−0,0)=(1,0). Similar calculations can be performed to determine the coordinates of the element 406 in other coordinate systems as well.

Particular coordinate systems may be adapted to readily identify particular elements using window functions. For example, the second coordinate system (diagonal-1, column) and the third coordinate system (diagonal-2, column) can be used in window functions to identify elements that are adjacent to a particular element at the corners of the particular element. The first coordinate system (row, column) can be used in window functions to identify elements above and below, and to the left and right of a particular element. In some implementations, a complete set of neighboring elements that are adjacent to a particular center element may be obtained by identifying multiple subsets of elements adjacent to the particular center element, where each of the multiple subsets of elements is identified using a distinct coordinate system. Additionally, other coordinate systems may be used with window functions, for example, to identify elements that are not necessarily adjacent to a particular element, but that are located at some other defined location relative to the particular element (e.g., two elements below, 1 element to the right of the particular element).

In one example, three of the coordinate systems described with respect to FIG. 4 can be used together to identify the complete set of 8 elements that are adjacent to a particular center element within a two-dimensional instance of data object 400. The three coordinate systems in this example can be used to identify each of the elements in the 3×3 neighborhood of a center element. A first subset of 4 adjacent elements directly above and to the left and right of the center element can be identified using coordinates in the first coordinate system of (row, column) values. A second subset of 2 adjacent corner elements can be identified using the second coordinate system of (diagonal-1, column) values. A third subset of 2 adjacent corner elements can be identified using the third coordinate system of (diagonal-2, column) values. Within the first coordinate system, the first subset of adjacent elements are identified by evaluating window functions that identify elements that are offset from the center element in one dimension of the first coordinate system, i.e., by one column or by one row. For example, the element directly above the center element can be identified using a window function that accesses an element within the first coordinate system that is one row up from the center element. The element directly below the center element can be identified by accessing an element one row down from the center element. The elements directly to the left and right of the center element can be identified by staying in the same row as the center element and accessing elements that are located just one column left and right of the center element, respectively.

The second subset of 2 adjacent elements at a first pair of corners of a center element can be identified using window functions that access elements along the diagonal-1 dimension of the second coordinate system. Therefore, the second coordinate system can be used with window functions to identify corner adjacencies at the top-left and bottom-right corners of a center element. For example, consider the case where element 408 in FIG. 4 is the center element. The center element 408 is located along the first diagonal axis at position 0 and is in column 1, so that its coordinates in the second coordinate system are (0,1). By using window functions to identify elements that are offset from the center element by just one unit in the column dimension of the second coordinate system, the pair of adjacent corner elements that lie within the same first diagonal (diagonal-1) of the center element can be determined. Thus, by moving one column left from the center element 408, the top-left corner element that lies in the same first diagonal as the center element 408 can be identified as having the coordinates (0,1−1)=(0,0) in the second coordinate system. By moving one column right from the center element 408, the bottom-right corner element that lies in the same first diagonal as the center element 408 can be identified as having the coordinates (0,1+1)=(0,2) in the second coordinate system.

The third subset of 2 adjacent elements at a second pair of corners of a center element can be identified similarly to the first pair, but using window functions in the third coordinate system rather than the second. For example, in the case where element 408 is again the center element, its coordinates in the third coordinate system are (2,1) since its diagonal-2 value is 2 and it is in column 1. A window function can identify the top-right corner element by accessing the element that is in the same diagonal-2 dimension as center element 408, but that is 1 column to the right of the center element 408. Thus, coordinates of the top-right corner element in the third coordinate system are (2,2). Another window function can identify the bottom-left corner element by accessing the element that is in the same diagonal-2 dimension as center element 408, but that is one column to the left of the center element 408. Thus, coordinates of the bottom-left corner element in the third coordinate system are (2,0).

In some implementations, distinct structures of data objects may require distinct coordinate systems. Coordinate systems can be particularly adapted to identify neighboring nodes for particular structures of data objects. For example, multiple coordinate systems, some of which include diagonal dimensions, may be used with window functions to identify neighboring nodes in a two-dimensional array of elements such as object 400 in FIG. 4. On the other hand, additional and/or different coordinate systems and different combinations of coordinate systems may be required to identify neighboring nodes in other structures such as 3-dimensional crystal lattices. Even among different structures of crystal lattices, such as face-centered cubic and body-centered cubic lattices, distinct coordinate systems may be required that are adapted for the particular structure at hand.

FIG. 5 shows an example SQL query 500 for generating a smoothed image from an original image represented in a database table. The SQL query 500 in this example is programmed to generate a smoothed image of a two-dimensional color image such as the pinecone image depicted in FIG. 2A. The color image may be represented in an original data object comprising a grid of pixels that each specify red, green, and blue intensity values (or other color values such as HSL, HSV). A table representation of the color image on which the SQL query is configured to operate on represents the pixels (elements) in the image in respective table rows that specify the row and column coordinates of each pixel in the image, and the respective red, green, and blue intensity values for each pixel. One example of such a table is table 306, which is depicted in FIG. 3C. In some implementations (not shown), the SQL query may be adapted to operate on a table that includes additional columns that correspond to pixel coordinates in one or more dimensions of alternate coordinate systems such as the diagonal-1 and diagonal-2 coordinates of the pixels as depicted in FIG. 4. However, as shown in example query 500, coordinate values in the alternate coordinate systems may also be expressed in terms of row and column values (e.g., diagonal-1 values are determined from the expression 'row−col').

The SQL query 500 operates on a table named 'testim,' which stores information about an original color image such as information like that in table 306. The 'testim' table has columns 'img_name,' 'row,' 'col,' and 'B_intensity' which represent, respectively, the name of the image to be processed, the row of each pixel, the column of each pixel, and the blue intensity level of each pixel. For purposes of this example, the query 500 only explicitly operates on the blue intensity levels of each pixel. However, in some implementations, the query 500 can be expanded to operate on any combination of pixel values such as red, blue, and green intensity levels. More generally, either a single database query or multiple database queries together may be programmed to instruct a database system to perform operations such as window functions on one or more values associated with one or more elements in a table representation of a structured data object.

The query 500 is generally configured to perform a smoothing filter on an image by performing window functions centered on each pixel in the image and averaging, for each pixel, the blue intensity values of the pixel and its adjacent pixels in a 3×3 neighborhood. The averaging (e.g., mean) function can be implemented in one or more ways. For example, query 500 uses 'array_mean' (line 1) from the MADLIB in-database machine learning and analytics library for an efficient calculation of the mean blue intensities. In some implementations, the query 500 may include instructions for one or more other functions or other operations that operate on data identified by window functions in the query. For example, the database query 500 may include a complex SQL-defined function or user-defined function written in a procedural language such as PLR or PLpython to perform operations on data collected using window functions. In one example, the query 500 may use a user-defined function written in a procedural language, rather than the MADLIB function, to calculate the mean intensity level of pixels or to perform other image processing operations.

The query 500 includes code (lines 3-16) for identifying pixels that are adjacent to each pixel in the image in a 3×3 neighborhood. For each pixel in the image, the code implements a plurality of window functions that are centered on the respective center pixel and that identify the eight pixels adjacent to the center pixel. The query 500 is programmed to cause the blue intensity value of each pixel in a 3×3 neighborhood of each center pixel to be identified. The query 500 includes code (line 3) for collecting the intensity of the center pixel. The intensity values of pixels above and below, and to the left and right, of the center pixel are collected using respective window functions 'lag' and 'lead' using coordinate systems based on row and column values. The portion of the query 500 at line 4 identifies data for the adjacent element that is directly above the center element, i.e., one row above the center element. The portion of the query 500 at line 5 identifies data for the adjacent element that is directly below the center element, i.e., one row below the center element. Line 6 of the query 500 identifies data for the adjacent element immediately to the left of the center element, i.e., in the same row as the center element but in an immediately preceding column. Line 7 of the query 500 identifies data for the adjacent element immediately to the right of the center element, i.e., in the same row as the center element but in a column that immediately follows the center element. Together, lines 4-7 of the query 500 comprise a first set 502 of window functions that identify adjacent pixels using a first coordinate system. Each of the adjacent elements identified by the first set 502 of window functions is accessed by moving a determined amount from the center element along only one dimension (i.e., a row or a column) in the first coordinate system.

A second set 504 of window functions identifies adjacent pixels that are offset from the center pixel along each of two diagonals. Thus, the second set 504 of window functions identifies corner adjacencies that are offset from a center pixel by a defined amount in only one dimension of alternate coordinate systems other than the first coordinate system. Generally, the second set 504 of window functions implements window functions using the second and third coordinate systems described above with respect to FIG. 4. In particular, lines 8-11 of the query 500 include code for window functions that identify pixel intensities along the diagonal-1 dimension of the second coordinate system, and lines 12-15 of the query 500 include code for window functions that identify pixel intensities along the diagonal-2 dimension of the third coordinate system. Thus, lines 8-9 of the query 500 identify data for the top-left adjacent corner element, i.e., the element that is located in the row that immediately precedes the row of the center element and the column that immediately precedes the column of the center element so that the elements have a common diagonal-1 position but different column positions. Lines 10-11 of the query 500 identify data for the bottom-right adjacent corner element, i.e., the element that is located in the row and column that immediately follows the row and column of the center element, respectively. Lines 12-13 of the query 500 identify data for the bottom-left adjacent corner element, i.e., the element that is located in the row that immediately follows the row of the center element and the column that immediately precedes the column of the center element. Lines 14-15 of the query 500 identify data for the top-right adjacent corner element, i.e., the element that is located in the row that immediately precedes the row of the center element and the column that immediately follows the column of the center element.

The query 500 can be programmed to cause window functions to be centered on each of the elements in the image being processed. In some implementations, the window functions are programmed using 'lag' and 'lead' operations. By partitioning and ordering the element set in distinct manners for different ones of the window functions, distinct coordinate systems are provided that cause the lag and lead window functions to identify different ones of the adjacent elements that are offset from the center element along one dimension of different coordinate systems. For example, the respective elements that are directly above each center element can be identified by the query 500 code (line 4) 'lag(B_intensity) over(partition by col order by row)).' In this code, the 'lag' window function specifies that an element in the preceding row in the same column is to be identified (whereas 'lead' looks at the subsequent element). Partitioning by column and ordering by row thus implements a first coordinate system. Another, different coordinate system is implemented in the window function at line 11 of the query 500 by partitioning by (row-column) and ordering by column so that the 'lag' function identifies an element that precedes a particular center element by column but that is in the same diagonal-1 dimension as the center element, and the 'lead' function identifies an element that immediately follows the particular center element by column but that is also in the same diagonal-1 dimension as the center element. In some implementations, distinct coordinate systems may generally be defined as required for differently structured data objects by modifying the manner in which elements from the table representation of the data object are partitioned and ordered. For example, coordinate systems may be implemented by partitioning and ordering a data set in a table that allow window functions to identify any arbitrary element in a defined relationship to a center element, such as an element that is n rows removed from a center element and m columns removed, such as to expand the scope of elements identified beyond just those elements that are adjacent to a center pixel.

In some implementations, other techniques may be used to identify adjacencies for a structured data object in database. For example, rather than using window functions to identify adjacencies, such as in the manner shown in query 500 in FIG. 5, one or more self-joins may be performed to identify elements within a neighborhood of a center element. Because the image processing or other processing of a structured data object is still performed in database when self-joins are used, in some implementations, these techniques may still have certain advantages over processing out of database. For example, massively parallel processing in database may permit faster processing and reduced end-to-end latency as compared to out of database processing. However, in some implementations, identifying adjacencies using window functions in one or more coordinate systems, such as in the query 500 of FIG. 5, may be even more efficient (e.g., faster and reduced computational expense) over query techniques based on self-joins. For example, queries that use window functions with multiple coordinate systems, such as query 500, may identify multiple neighboring elements for each of a plurality of center elements in just one pass through a set of data, whereas self-joins may require multiple passes through the set of data.

Figure 6:
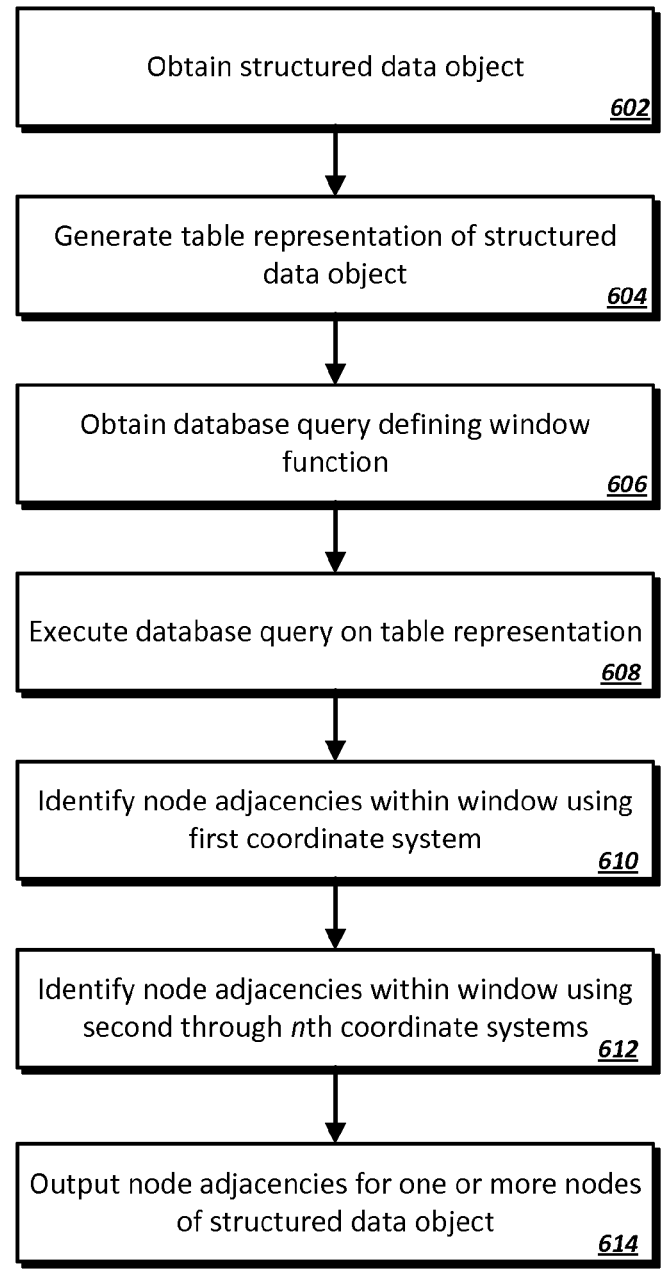
FIG. 6 depicts a flowchart of an example process for identifying adjacent elements in a structured data object in database.

Turning now to FIG. 6, a flowchart is depicted of an example process 600 for identifying adjacent elements in a structured data object in database. In some implementations, the process 600, as with the techniques described throughout this paper, may be carried out by a computing system of one or more computers. Processing within the computing system may be distributed, for example, to leverage the power of multiple computers in parallel. The process 600 may be implemented in a cloud-based service. For example, client devices may upload an image or other structured data object that is to be processed to one or more remote servers that offer the cloud-based service. The one or more remote servers may be configured to generate a table representation of the data object and to perform various operations on the data object in database, such as performing window functions to identify adjacent elements.

At stage 602, the process 600 obtains a structured data object. The structured data object may be any ordered collection of data elements, such as an image, a video, a dense graph, or a model of a crystal lattice. The elements in the data object may be arranged in one or more dimensions and be represented by nodes. For example, a timeline may be one-dimensional and may have elements corresponding to chronological events. A photograph may be a two-dimensional collection of pixel elements, and a video a three-dimensional collection of pixel elements in which two dimensions are spatial and one dimension is time. The elements in a data object may be structured according to a certain order that is specific to the data object. For example, an image may be represented as a grid of pixels that are ordered into rows and columns. Some data objects may have other structures, such as a honeycomb lattice of carbon atoms for a model of graphene.

At stage 604, a table representation of the structured data object is generated. The structured data object can be converted to a defined data model for representation in one or more database tables. For example, in one model, an entry for each element in a data object is provided in an individual row in a database table so that the table has a plurality of rows that each correspond to a respective element. Columns in the database table may be assigned to various pieces of information associated with elements in the data object. For example, a database table may include a data object name column, an identifier column, one or more columns for the coordinates of elements in the data object in one or more coordinate systems, one or more substantive values (e.g., pixel intensity levels in an image, or names in a social network graph) represented by the elements, or a combination of these. Some examples of table representations of structured data objects are depicted by tables 104b, 204, and 304 in FIGS. 1, 2B, and 3B, respectively.

At stage 606, a database query is obtained that defines one or more window functions to be applied to the table representation of the structured data object. In some implementations, the database query may be pre-defined and may be applicable to one or more classes of data objects. For example, a computing system may store multiple different queries that are each applicable to a different class of data objects. Data objects may be classified based on their structure. For example, a first query may be programmed to identify adjacencies from a two-dimensional grid structure object, such as a photograph. Another query may be programmed to identify adjacencies from a particularly formatted video, and another query may be programmed to identify adjacencies in a honeycomb lattice. In some implementations, the computing system may automatically generate a query based on one or more properties of the data object being processed. For example, a template query may define the outline of a query, and the template may be completed based on information determined from the data object that will be processed (e.g., column names, table names, etc.). In some implementations, the computing system may automatically select or generate a query, and present the query to a user. The user may take action upon review of the query such as confirming selection of the query, editing the query, or selecting another query. In some implementations, the query may be automatically determined without user intervention. In some implementations, a user may provide the query to the computing system without the query being automatically generated.

The query may be a SQL query or other suitable database query that is compatible with a database system that hosts the table representation of the structured data object. One example of a SQL query that includes window functions for identifying adjacencies in a two-dimensional array of elements is shown as query 500 in FIG. 5.

At stage 608, the process 100 executes the database query on the table representation of the structured data object. The query may include one or more window functions that use distinct coordinate systems to identify adjacent elements (or other elements offset from a center element according to other defined relationships). For example, the database query 500 depicted in FIG. 5 includes eight window functions, particular ones of which use different coordinate systems, to identify the eight adjacent nodes in a 3×3 neighborhood of a center pixel. At stage 610, a first subset of adjacent elements is identified using a first coordinate system. At stage 612, any additional subsets of adjacent elements are identified using alternate coordinate systems. For example, if the query includes window functions that use n=3 coordinate systems to identify three different subsets of adjacent elements, then the second and third subsets of adjacent elements can be identified at stage 612.

At stage 614, the process 100 outputs a result based on the one or more window functions performed on the table representation of the data object. In some implementations, the result may be an identification of the adjacent elements for all or some of the elements in the data object. For example, the coordinates of the adjacent pixels in an image may be output and presented to a user or provided to another computer program for further processing. Other information based on the adjacent elements may also be determined. For example, the color intensities of adjacent pixels may be the output of processing an image in database.

The process 100 may also use the results of window functions to perform one or more operations with respect to a structured data object. All or some of the operations may be executed in database. For example, various image processing operations can be efficiently performed in database, even on very high-resolution images. An example of a query that uses window functions to perform a uniform image smoothing filter is shown depicted by query 500 in FIG. 5. However, other database queries can also be used to perform one or more other image processing operations such as thresholding, morphological operations, object recognition, and object counting.

Figure 7:
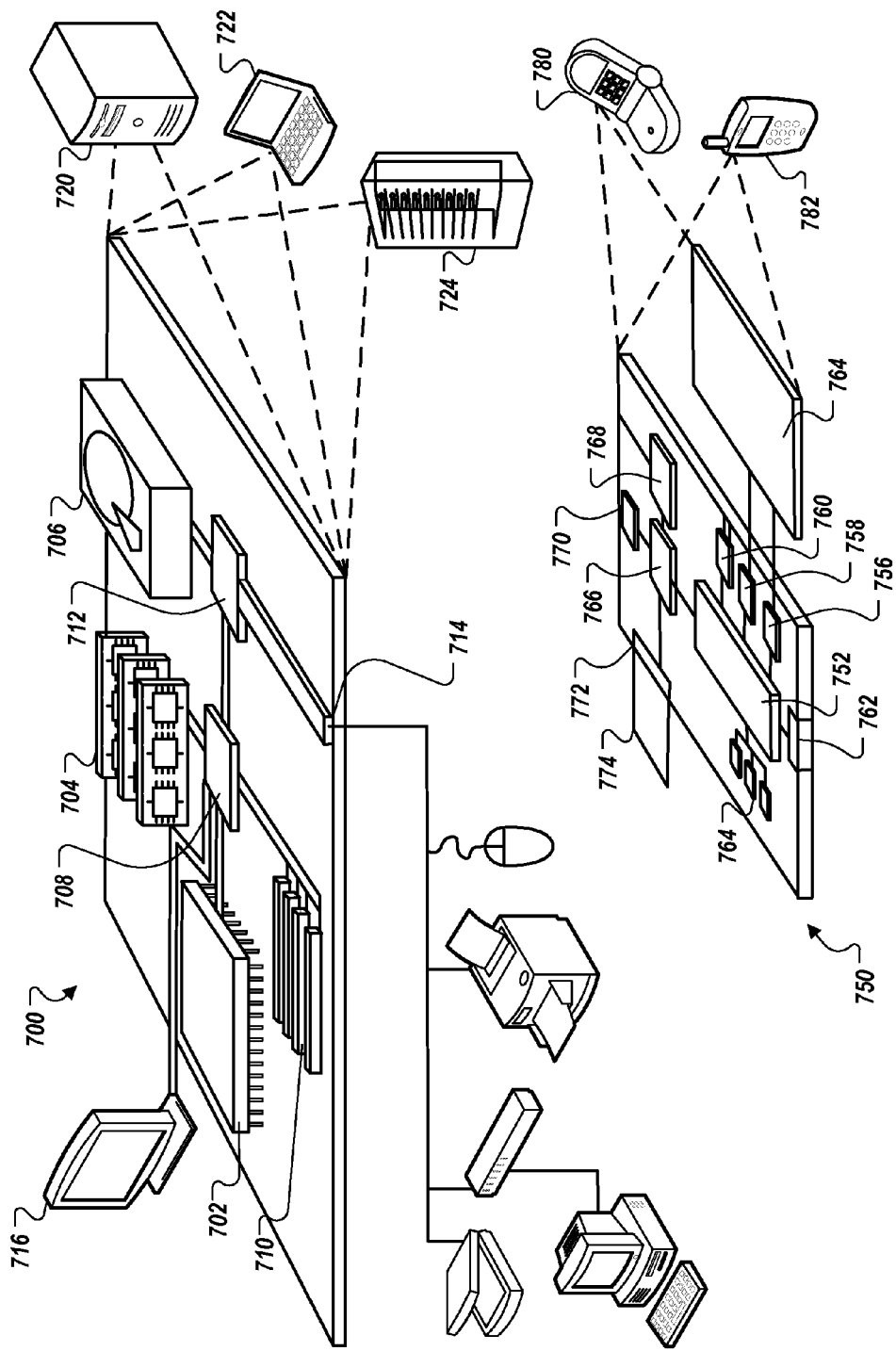
FIG. 7 depicts an example of a computing device and a mobile computing device that can be used to implement the techniques described in this paper.

FIG. 7 shows an example of a computing device 700 and a mobile computing device that can be used to implement the techniques described herein. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A computer-implemented method, comprising:
  obtaining a structured data object that includes a plurality of nodes arranged relative to each other in respective positions of the structured data object;
  generating one or more tables in a database management system (DBMS) that define a table representation of the structured data object, the one or more tables including, for each of the plurality of nodes in the structured data object, a table entry that includes (i) a data value for the node and (ii) one or more position values for the node that represent the respective position of the node in the structured data object; and
  for each of one or more first nodes from among the plurality of nodes:
    (i) performing, by the DBMS on the one or more tables, a first window function that returns the data value for a first neighboring node of the first node based on the first neighboring node being positioned in the structured data object at a first pre-defined offset relative to the respective position of the first node in a first dimension of the structured data object defined by a first coordinate system; and

(ii) performing, by the DBMS on the one or more tables, a second window function that returns the data value for a second neighboring node of the first node based on the second neighboring node being positioned in the structured data object at a second pre-defined offset relative to the respective position of the first node in a second dimension of the structured data object defined by a second coordinate system, wherein the second dimension of the structured data object is not defined by the first coordinate system and runs in a different direction in the structured data object than the first dimension; and adjusting, by the DBMS using the data values returned by the first and second window functions for at least some of the first nodes, the data values for particular ones of the plurality of nodes in the structured data object.

2. The computer-implemented method of claim 1, wherein the structured data object comprises an image, and wherein the plurality of nodes comprises a plurality of pixels in the image.

3. The computer-implemented method of claim 2, wherein the one or more tables that define the table representation of the structured data object comprise a plurality of rows, each row corresponding to a particular pixel in the image and including respective table elements that identify a position of the particular pixel in the image and one or more color intensity values for the particular pixel.

4. The computer-implemented method of claim 1, wherein the structured data object comprises a dense graph.

5. The computer-implemented method of claim 1, wherein:
the structured data object comprises an n-dimensional array of nodes,
generating the one or more tables that define the table representation of the structured data object comprises converting the n-dimensional array into one or more database tables, and
each of one or more rows in the database tables stores the respective data value and the respective position values for a different node from among the plurality of nodes.

6. The computer-implemented method of claim 1, further comprising executing, by the DBMS, a single database query that returns the respective data values for the first and second neighboring nodes for all of the one or more first nodes in a single pass through the table representation of the data structure.

7. The computer-implemented method of claim 6, wherein the single database query comprises a structured query language (SQL) query.

8. The computer-implemented method of claim 1, wherein for each of the one or more first nodes, performing the first window function comprises returning the data value of the first neighboring node as a result of the first neighboring node being adjacent to the first node in the first dimension of the structured data object.

9. The computer-implemented method of claim 8, wherein for each of the one or more first nodes, performing the second window function comprises returning the data value of the second neighboring node as a result of the second neighboring node being adjacent to the first node in the second dimension of the structured data object.

10. The computer-implemented method of claim 8, wherein for each of the one or more first nodes:
the first neighboring node is positioned directly above, below, or to a side of the first node in the structured data object and is offset from the first node in only one dimension defined by the first coordinate system, and
second neighboring node is diagonally adjacent to the first node in the structured data object and is offset from the first node in only one dimension defined by the second coordinate system.

11. The computer-implemented method of claim 1, wherein, for each of the one or more first nodes, performing the first and second window functions to return the data values of the first and second neighboring nodes, respectively, comprises performing one or more self-joins on the one or more tables that define the table representation of the structured data object.

12. The computer-implemented method of claim 1, comprising:
for each of the one or more first nodes, determining a composite data value for the first node based at least on the respective data values for the first and second neighboring nodes of the first node.

13. The computer-implemented method of claim 12, wherein:
the structured data object comprises an image; and
the method comprises filtering the image by adjusting, for each of the one or more first nodes, the data value for the first node based on the composite data value for the first node.

14. One or more computer-readable devices having instructions stored thereon that, when executed by one or more computers, cause the one or more computers to perform operations comprising:
obtaining a structured data object that includes a plurality of nodes arranged relative to each other in respective positions of the structured data object;
generating one or more tables in a database management system (DBMS) that define a table representation of the structured data object, the one or more tables including, for each of the plurality of nodes in the structured data object, a table entry that includes (i) a data value for the node and (ii) one or more position values for the node that represent the respective position of the node in the structured data object; and
for each of one or more first nodes from among the plurality of nodes:
(i) performing, by the DBMS on the one or more tables, a first window function that returns the data value for a first neighboring node of the first node based on the first neighboring node being positioned in the structured data object at a first pre-defined offset relative to the respective position of the first node in a first dimension of the structured data object defined by a first coordinate system; and
(ii) performing, by the DBMS on the one or more tables, a second window function that returns the data value for a second neighboring node of the first node based on the second neighboring node being positioned in the structured data object at a second pre-defined offset relative to the respective position of the first node in a second dimension of the structured data object defined by a second coordinate system, wherein the second dimension of the structured data object is not defined by the first coordinate system and runs in a different direction in the structured data object than the first dimension; and
adjusting, by the DBMS using the data values returned by the first and second window functions for at least some of the first nodes, the data values for particular ones of the plurality of nodes in the structured data object.

15. The one or more computer-readable devices of claim 14, wherein the operations comprise executing, by the DBMS, a single database query that returns the respective data values for the first and second neighboring nodes for all of the one or more first nodes in a single pass through the table representation of the structured data object.

16. The one or more computer-readable devices of claim 15, wherein the single database query includes code written in a procedural language.

17. The one or more computer-readable devices of claim 14, wherein for each of the one or more first nodes, performing the first window function comprises returning the data value of the first neighboring node as a result of the first neighboring node being adjacent to the first node in the first dimension of the structured data object.

18. The one or more computer-readable devices of claim 17, wherein for each of the one or more first nodes, performing the second window function comprises returning the data value of the second neighboring node as a result of the second neighboring node being adjacent to the first node in the second dimension of the structured data object.

19. A system comprising:
one or more processors; and
one or more computer-readable devices having instructions stored thereon that, when executed by the one or more processors, cause the one or more processors to perform operations comprising:
obtaining a structured data object that includes a plurality of nodes arranged relative to each other in respective positions of the structured data object;
generating one or more tables in a database management system (DBMS) that define a table representation of the structured data object, the one or more tables including, for each of the plurality of nodes in the structured data object, a table entry that includes (i) a data value for the node and (ii) one or more position values for the node that represent the respective position of the node in the structured data object; and
for each of one or more first nodes from among the plurality of nodes:
  (i) performing, by the DBMS on the one or more tables, a first window function that returns the data value for a first neighboring node of the first node based on the first neighboring node being positioned in the structured data object at a first pre-defined offset relative to the respective position of the first node in a first dimension of the structured data object defined by a first coordinate system; and
  (ii) performing, by the DBMS on the one or more tables, a second window function that returns the data value for a second neighboring node of the first node based on the second neighboring node being positioned in the structured data object at a second pre-defined offset relative to the respective position of the first node in a second dimension of the structured data object defined by a second coordinate system, wherein the second dimension of the structured data object is not defined by the first coordinate system and runs in a different direction in the structured data object than the first dimension; and
adjusting, by the DBMS using the data values returned by the first and second window functions for at least some of the first nodes, the data values for particular ones of the plurality of nodes in the structured data object.

20. The system of claim 19, wherein for each of the one or more first nodes, performing the first window function comprises returning the data value of the first neighboring node as a result of the first neighboring node being adjacent to the first node in the first dimension of the structured data object.

* * * * *